(12) United States Patent
Iwashiro et al.

(10) Patent No.: US 7,221,533 B2
(45) Date of Patent: May 22, 2007

(54) METHOD AND APPARATUS FOR SERVO INFORMATION WRITING IN A DISK DRIVE

(75) Inventors: Masafumi Iwashiro, Ome (JP); Masahide Yatsu, Akishima (JP); Hideo Sado, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/262,716

(22) Filed: Nov. 1, 2005

(65) Prior Publication Data

US 2006/0114599 A1 Jun. 1, 2006

(30) Foreign Application Priority Data

Nov. 30, 2004 (JP) ............................. 2004-347517

(51) Int. Cl.
 G11B 21/02 (2006.01)
 G11B 5/596 (2006.01)
(52) U.S. Cl. ...................................... 360/77.04; 360/75
(58) Field of Classification Search ..................... None
 See application file for complete search history.

(56) References Cited

U.S. PATENT DOCUMENTS

| 6,058,335 | A * | 5/2000 | Kim ............................. 700/108 |
| 6,130,797 | A | 10/2000 | Akagi et al. |
| 6,519,107 | B1 * | 2/2003 | Ehrlich et al. ................. 360/75 |
| 6,631,046 | B2 * | 10/2003 | Szita et al. .................... 360/75 |
| 7,006,322 | B2 * | 2/2006 | Sado ............................ 360/75 |
| 7,023,648 | B2 * | 4/2006 | Mizukoshi .................... 360/75 |
| 7,050,259 | B1 * | 5/2006 | Guo et al. ..................... 360/75 |
| 7,061,709 | B2 * | 6/2006 | Oki ............................. 360/75 |
| 2004/0160696 | A1 | 8/2004 | Meyer |
| 2005/0073773 | A1 * | 4/2005 | Sasaki et al. ............... 360/126 |

FOREIGN PATENT DOCUMENTS

| JP | 3295940 B2 | 6/2002 |
| JP | 3336819 B2 | 10/2002 |
| JP | 2003-346305 A | 12/2003 |
| JP | 2004-303325 | 10/2004 |

OTHER PUBLICATIONS

Austrian Search Report dated Dec. 1, 2006 for Singapore Appln. No. 200506481-1.
Takaishi, K. et al.; "Hard Disk Drive Servo Technology For Media-Level Servo Track Writing"; IEEE Transactions on Magnetics, vol. 39; Issue 2; Part 1, Mar. 2003.

* cited by examiner

*Primary Examiner*—K. Wong
(74) *Attorney, Agent, or Firm*—Pillsbury Winthrop Shaw Pittman, LLP

(57) ABSTRACT

A method of writing servo information for use in head positioning control on a disk medium incorporated in a disk drive, including executing the head positioning control based on original servo information recorded on the disk medium, producing positioning correction information to correct a positioning error, and recording the positioning correction information in a correction information recording buffer.

10 Claims, 5 Drawing Sheets

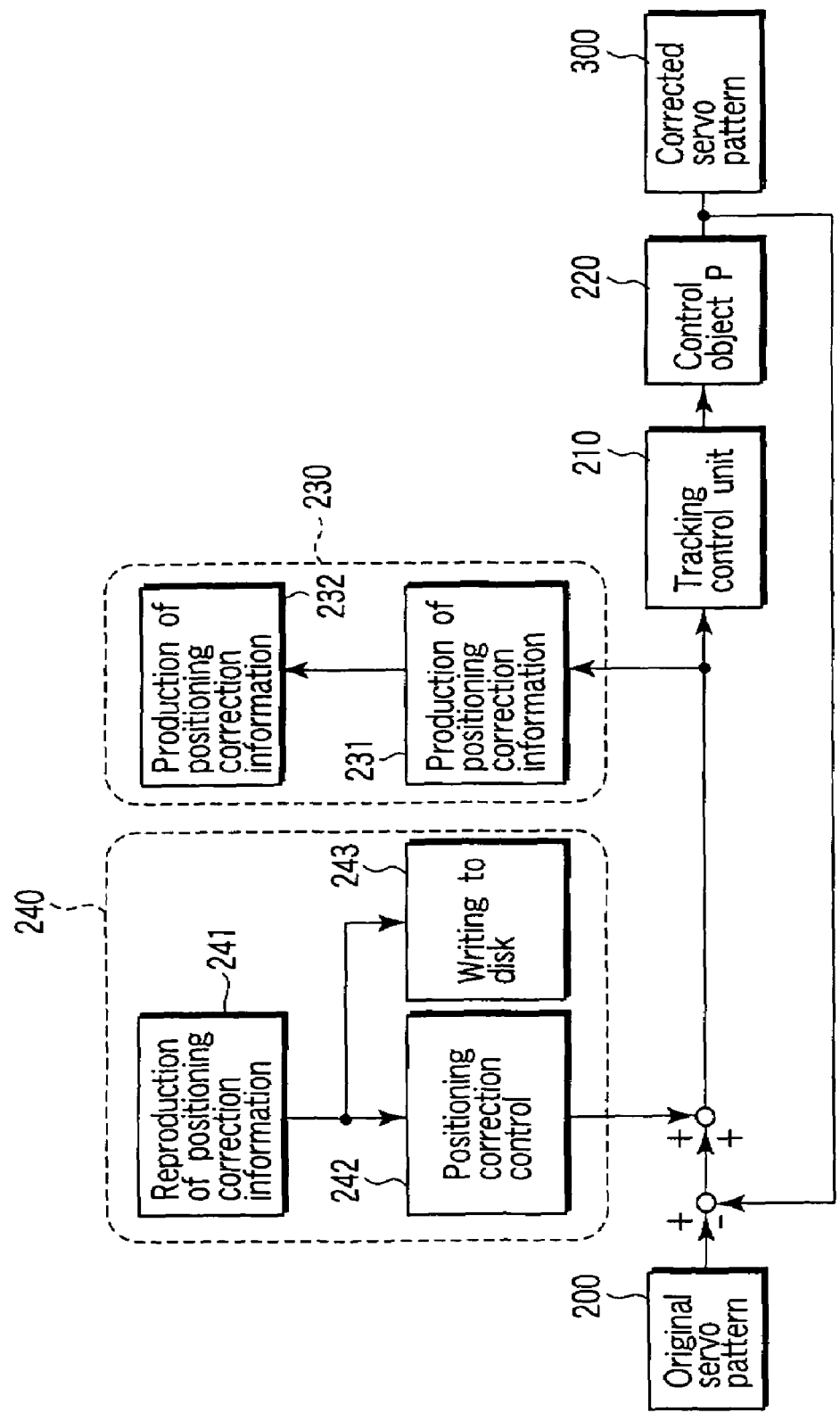
F I G. 2

METHOD AND APPARATUS FOR SERVO INFORMATION WRITING IN A DISK DRIVE

CROSS-REFERENCE TO RELATED APPLICATIONS

This application is based upon and claims the benefit of priority from prior Japanese Patent Application No. 2004-347517, filed Nov. 30, 2004, the entire contents of which are incorporated herein by reference.

BACKGROUND OF THE INVENTION

1. Field of the Invention

The present invention relates generally to a servo information writing method of writing servo information of a disk drive to a disk medium, and more particularly, it relates to a method of writing servo information including positioning correction information.

2. Description of the Related Art

In recent years, in a disk drive represented by a hard disk drive, servo information (servo pattern) for use in head positioning control is recorded on a disk medium for use as a data recording medium.

In steps of manufacturing the disk drive, a servo writing step of recording the servo information on the disk medium is one of the important steps which influence efficiency of the whole manufacturing steps. Therefore, there have been proposed or developed various types of servo writing methods in order to enhance the efficiency. In the methods, there has been noted a magnetic transfer method in which the servo information is transferred and recorded from a disk as a master board to the disk medium incorporated in the disk drive by a magnetic transfer process.

Additionally, the servo information (hereinafter referred to as the original servo information) of a transferor recorded in the master board has a possibility that distortion is generated by, for example, an attaching error in attaching the master board to a device for writing the original servo information.

Moreover, in the steps of manufacturing the disk drive, disk eccentricity is sometimes generated in the disk medium by an assembly error or the like in a step of assembling the disk medium into the drive. Therefore, there is a high possibility that a positioning error is caused by the distortion of the original servo information and the disk eccentricity of the disk medium, when the head positioning control is executed in the disk drive by use of the original servo information transferred to the disk medium as such.

To solve the problem, there is proposed a method of measuring the disk eccentricity for each disk medium in which the servo information is recorded to record the disk eccentricity as positioning correction information on the disk medium (see, e.g., Jpn. Pat. No. 3295940).

A conventional method is a method of measuring the disk eccentricity (as a result, the distortion of the servo information) for each disk medium to produce the positioning correction information, and recording the information on the disk medium. However, in this method, time required for the servo writing step increases as much as time required for processing to produce the positioning correction information for each disk medium.

BRIEF SUMMARY OF THE INVENTION

In accordance with an aspect of the present invention, there is provided a servo information writing method in which reduction of time for producing positioning correction information is realized to thereby reduce time required for a servo writing step, and efficiency can be enhanced as a result.

The method of servo information writing is a servo information writing method of writing servo information for use in head positioning control on a disk medium incorporated in a disk drive, comprising: executing the positioning control of a head included in the disk drive based on original servo information recorded on the disk medium; producing positioning correction information to correct a positioning error by the positioning control; recording the positioning correction information in storage means disposed outside the disk drive; and acquiring the positioning correction information to write the information to the disk medium incorporated in the disk drive.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing a control system of positioning correction information according to the present embodiment;

DETAILED DESCRIPTION OF THE INVENTION

An embodiment of the present invention will be described hereinafter with reference to the drawings.

(Constitution of Disk Drive)

A disk drive of the present embodiment has a constitution including a function (servo information writing device) of producing positioning correction information described later, recording the information, and writing the information in a disk medium in a servo writing step included in manufacturing steps.

Figure 1:
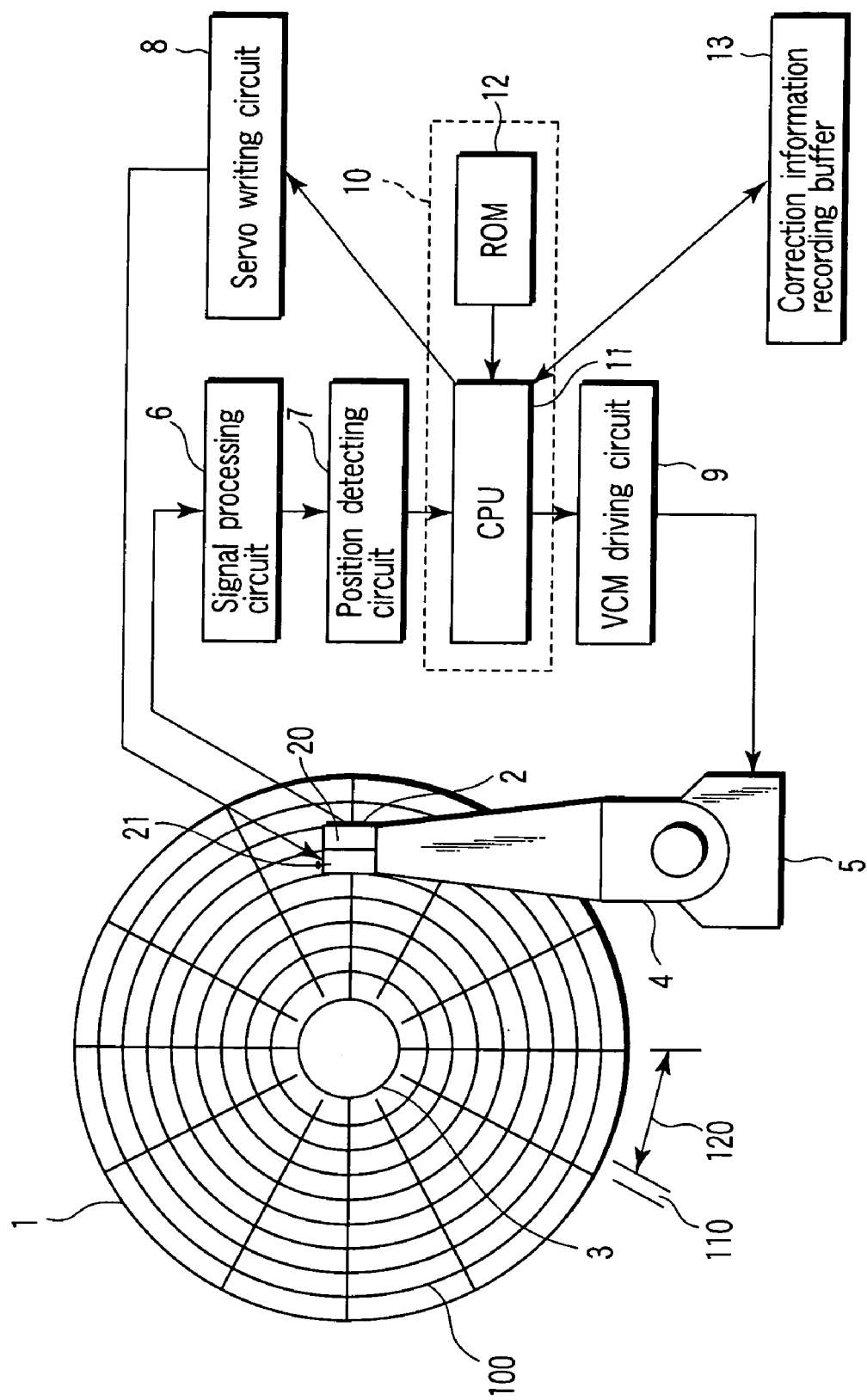
FIG. 1 is a block diagram showing a main part of a disk drive according to an embodiment of the present invention.

As shown in FIG. 1, in a constitution of the present disk drive, there are incorporated a data recording/reproducing system, a head positioning control system (servo system), and a disk medium 1 which are constituting elements of the disk drive shipped as a product. The respective elements will be described hereinafter specifically.

In the disk medium 1, original servo information transferred from an original board is recorded by, for example, a magnetic transfer method. It is to be noted that the disk medium 1 may be a disk medium in which the original servo information is recorded by, for example, a patterned media recording method other than the magnetic transfer method.

The disk medium 1 is attached to a spindle motor 3, and rotated at a certain angular speed. A large number of tracks 100 are constituted in the disk medium 1 at a product shipping time. Each track 100 is provided with: a servo area 110 in which the original servo information and the positioning correction information are recorded; and a data area (data sector) 120 in which user data is recorded.

A head 2 executes a read/write operation for recording or reproducing data (including the positioning correction information in the present embodiment) with respect to the disk medium 1. The head 2 includes: a read head element 20 which performs the read operation (reproduction); and a write head element 21 which performs the write operation (recording). The read head element 20 reads the servo information (including the positioning correction information) from a rotating disk medium 1 at a certain time interval.

The head 2 is mounted on an arm 4 included in an actuator, and the head is moved and controlled in a radial direction of the disk medium 1 by a voice coil motor (VCM) 5 which is a driving source of the actuator. The actuator is driven and controlled by a servo system described later.

The data recording/reproducing system includes a signal processing circuit (read/write channel) 6 and a servo writing circuit 8. The signal processing circuit 6 has a function of reproducing a servo information signal or a user data signal from a read signal read by the read head element 20, or a function of correcting an error of the reproduced signal.

The servo writing circuit 8 is a circuit which produces the servo information required for a servo information writing operation. Additionally, in the present embodiment, the servo writing circuit 8 produces the servo information which is not included in the original servo information.

A servo system includes a position detecting circuit 7, a VCM driving circuit 9, and a controller 10. The position detecting circuit 7 detects a position of the head 2 on the disk medium 1 from the servo information signal reproduced by the signal processing circuit 6.

The controller 10 includes a microprocessor (CPU) 11, and a memory (ROM, flash EEPROM, or the like) 12, and executes a positioning control of the head 2, or servo information write processing of the present embodiment. The CPU 11 is a main element of the controller 10, and executes a program stored in the memory 12 to thereby execute the positioning control of the head 2 via the VCM driving circuit 9. Furthermore, the CPU 11 produces the positioning correction information described later. The memory 12 stores various types of control parameters in addition to the program of the CPU 11.

The VCM driving circuit 9 supplies a driving current to the VCM 5 to drive the actuator in accordance with the positioning control of the CPU 11.

A correction information recording buffer 13 is a memory (e.g., flash EEPROM) which is accessed by the CPU 11 and in which the positioning correction information is recorded. The correction information recording buffer 13 is an external memory of the disk drive, mounted on a printed board detachably attached to, for example, the disk drive, and connected to the CPU 11 via an interface mounted on the printed board.

The correction information recording buffer 13 has a capacity to store the positioning correction information corresponding to all tracks (all of the tracks in opposite surfaces), respectively, constituted in the disk medium 1 incorporated in the disk drive. Additionally, in the present embodiment, the disk medium 1 incorporated in the disk drive is one disk whose opposite surfaces are used as data recording surfaces.

(Control System of Positioning Correction Information)

FIG. 2 is a block diagram showing a control system for realizing a series of processes executed by the CPU 11 to produce, record, and write the positioning correction information in the disk medium 1.

A controller (tracking control unit, transmission function C) 210 corresponds to a head positioning control (feedback control) function of the CPU 11. A control object (plant, transmission function P) 220 is the head 2, but is the VCM 5 of the actuator in a narrow sense.

An original servo pattern 200 is original servo information (servo pattern transferred from the original board) recorded in the disk medium 1. A corrected servo pattern is servo information (servo information for use by the disk drive as the product) including the original servo information recorded in the disk medium 1 and the written positioning correction information.

A block 230 is a processing system executed by the CPU 11 and including production processing (231) of the positioning correction information and recording processing (232) in the correction information recording buffer 13. A block 240 is a processing system executed by the CPU 11 and including reproduction processing (241) of the positioning correction information, positioning correction control (242) in which the positioning correction information is used, and write processing (243) of the positioning correction information in the disk medium 1.

(Servo Information Writing Method)

A servo information writing method of the present embodiment will be described hereinafter with reference to FIGS. 3 to 6 in addition to FIGS. 1 and 2.

As described above, the original servo information is transferred and recorded in the disk medium 1 from the original board by a magnetic transfer device. This disk medium 1 is incorporated in the disk drive, and rotated at a certain angular speed by the spindle motor 3.

Figure 5:
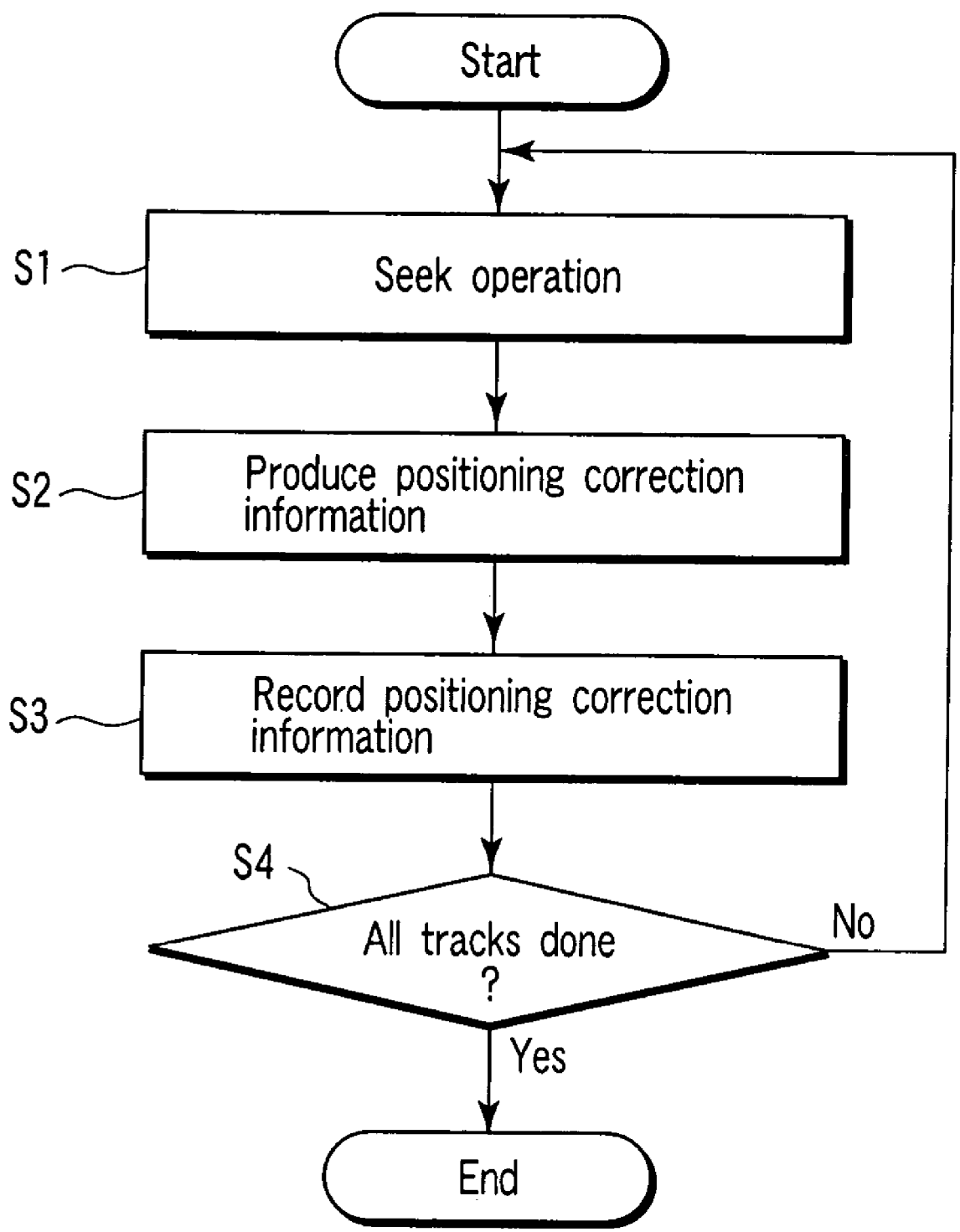
FIG. 5 is a flowchart showing a procedure for producing and recording the positioning correction information according to the present embodiment.

First, as shown in FIG. 2, the CPU 11 executes the feedback control to execute the positioning control of the head 2, and executes the processing system of the block 230. That is, as shown in FIG. 5, the CPU 11 drives and controls the actuator via the VCM driving circuit 9 to thereby move the head 2 (step S1). Specifically, the CPU 11 moves (seeks) the head, for example, from an outermost peripheral track of the disk medium 1 in an inner peripheral direction. Accordingly, the CPU 11 executes the positioning control of the head 2 for each track of the disk medium 1.

Here, in this positioning control, as shown in FIG. 2, the controller (CPU 11) 210 executes a sampled value control to determine a control input value into the VCM driving circuit 9 in order to drive and control the control object (VCM 5) at the certain time interval. The controller (CPU 11) 210 acquires the present position of the head 2 in synchronization with a rotation angle of the disk medium 1 based on the servo information signal reproduced from the servo area of the disk medium 1.

The CPU 11 executes the positioning control of the head 2 for each track of the disk medium 1, and measures distortion of the original servo information to produce the positioning correction information for correcting a positional error based on the measurement results (step S2). This method of producing this positioning correction information is a method similar to a method (measuring disk eccentricity) described in, for example, the above-described prior-art document. The method is similar to, for example, a method of correcting a rotation synchronous component of the disk medium having a residual error correction element and utilizing a feedforward filter function.

Figures 3, 4:
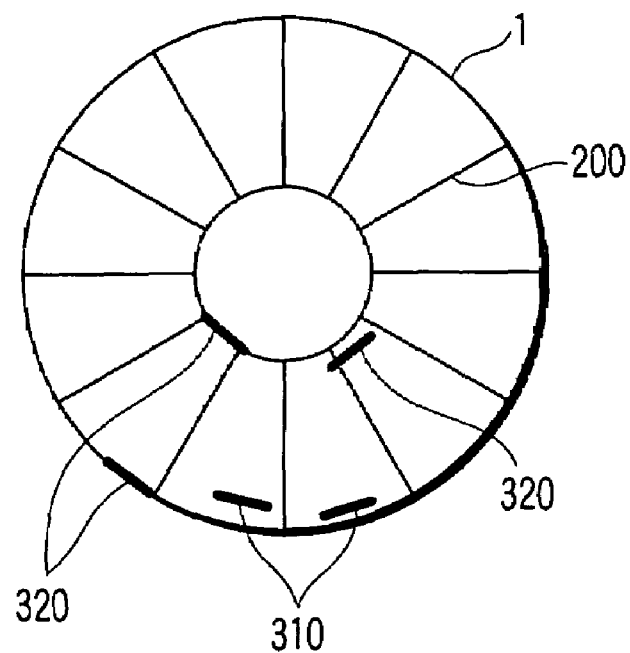
FIG. 3 is a diagram showing a recorded state of a disk medium according to a modification of the present embodiment.
FIG. 4 is a diagram showing one example of recorded contents of a correction information recording buffer according to the present embodiment.

As shown in FIG. 4, the CPU 11 associates the positioning correction information (P-0 to P-N) produced for each track with the corresponding track number (0 to N) to record the information in the correction information recording buffer 13 (step S3). The CPU 11 repeats the processing system of the block 230 to produce and record the positioning correction information corresponding to all of the tracks of the disk medium 1 until an end (step S4).

Next, as shown in FIG. 2, the CPU 11 executes the feedback control to execute the positioning control of the head 2, and executes the processing system of the block 240.

Here, it is assumed a case where the new disk medium 1 for use as the product is incorporated in the disk drive. Also in this disk medium 1, the original servo information is transferred and recorded from the original board by the magnetic transfer device as described above.

Figure 6:
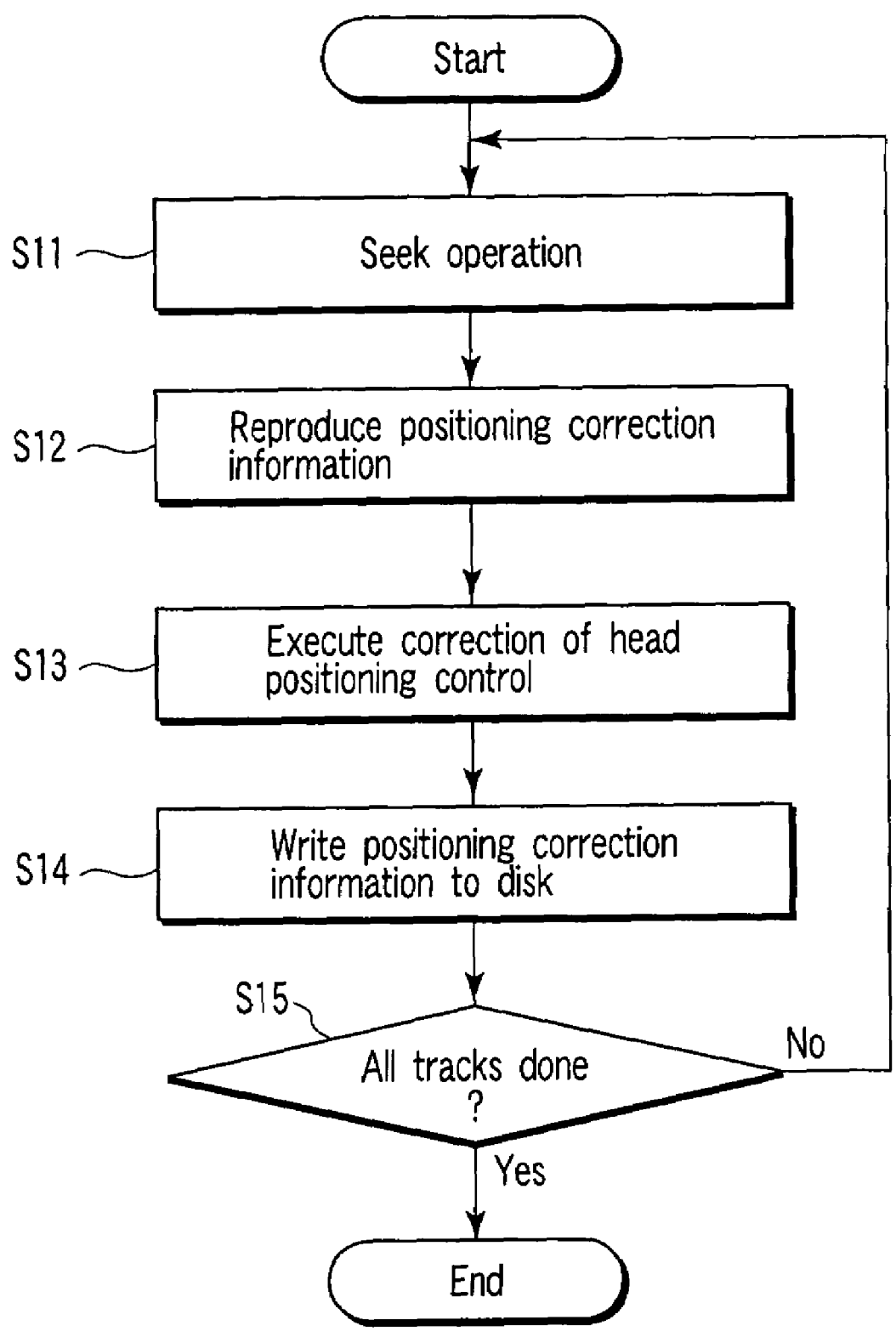
FIG. 6 is a flowchart showing a procedure for writing the positioning correction information in the disk medium according to the present embodiment.

As shown in FIG. 6, the CPU 11 executes the positioning control of the head 2 for each track while moving (seeking) the head, for example, from the outermost peripheral track of the disk medium 1 in the inner peripheral direction (step S11).

The CPU 11 accesses the correction information recording buffer 13, and reads the positioning correction information corresponding to the track in which the head 2 is positioned (step S12). The CPU 11 corrects the positioning control of the head 2 with respect to the track by use of the positioning correction information (step S13).

Moreover, the CPU 11 writes the positioning correction information reproduced from the correction information recording buffer 13 into the servo area 110 of the track by means of the write head element 21 included in the head 2 (step S14).

The CPU 11 repeats the write processing of the positioning correction information with respect to all of the tracks of the disk medium 1 till the end (step S15). That is, there is repeated the processing system 240 including the positioning correction control (242) in which the positioning correction information is used, and the write processing (243) of the positioning correction information in the disk medium 1 with respect to all of the tracks till the end.

It is to be noted that the above-described positioning correction information is produced again, and recorded in the correction information recording buffer 13 in a case where the CPU 11 confirms positioning precision, and judges that a rotation synchronous component of the disk medium 1 is large at a time of correction of the positioning control of the head 2.

Here, the CPU 11 corrects the head positioning control, when writing the positioning correction information in the disk medium 1. Accordingly, the positioning correction information can be written in a region of the track in which the distortion of the original servo pattern is corrected. Therefore, when the positioning correction information is written into the track region based on the original servo pattern having the distortion, occurrence of a reading error can be reduced.

As described above, according to the servo information writing method of the present embodiment, first the positioning correction information is produced in accordance with the measurement results of the distortion of the original servo pattern by the positioning control of the head 2 based on the original servo information. The information is stored in the correction information recording buffer 13 which is the external memory of the disk drive. Moreover, the positioning correction information stored in the correction information recording buffer 13 is written into the next disk medium without executing any processing to produce the positioning correction information.

Therefore, since it is possible to save a step of producing the positioning correction information for each disk medium incorporated in the disk drive, it is possible to reduce largely a time required for a step of writing the servo information including the original servo information due to magnetic transfer and the positioning correction information. In consequence, it is possible to enhance efficiency of the step of writing the servo information with respect to the disk medium 1.

(First Modification)

In the present embodiment, the CPU 11 executes the processing to produce the positioning correction information, record the information in the correction information recording buffer 13, and write the positioning correction information read from the correction information recording buffer 13 in the disk medium 1.

In the present modification, the CPU 11 may execute processing to produce positioning correction information, store the information once in a correction information recording buffer 13, and write the information into an original board incorporated in a disk drive. In this method, it is possible to transfer and record the positioning correction information together with original servo information from the original board in the disk medium 1 for use as a product by a magnetic transfer method.

(Second Modification)

FIG. 3 is a diagram showing a recorded state in a disk medium 1 according to a second modification of the present embodiment.

In the present modification, in a case where original servo information (original servo pattern 200) is transferred from an original board onto a disk medium 1 by a magnetic transfer device, there are recorded original board inherent numbers 310 and inherent numbers 320 of the magnetic transfer devices.

A CPU 11 also records the original board inherent numbers 310 and the magnetic transfer device inherent numbers 320, when producing the positioning correction information to record the information in a correction information recording buffer 13 in the above-described procedure.

Moreover, when the CPU 11 writes the positioning correction information into the next disk medium 1, the CPU reads from the correction information recording buffer 13 the positioning correction information corresponding to a combination of the original board inherent number 310 and the magnetic transfer device inherent number 320 recorded in the disk medium 1.

According to such method, in a case where the original servo information is transferred and recorded in the disk medium by use of a plurality of original boards and magnetic transfer devices, the positioning correction information adapted to the combination of the original board and the magnetic transfer device can be easily written in the disk medium.

That is, in a case where the combination of the original board and the magnetic transfer device is different, there is a high possibility that distortion of the original servo information transferred onto the disk medium 1 is different. Therefore, the CPU 11 can easily realize the writing in the disk medium the positioning correction information adapted to the combination of the original board and the magnetic transfer device by use of the original board inherent numbers 310 an dh magnetic transfer device inherent numbers 320 recorded in the disk medium 1.

It is to be noted that the original board inherent numbers 310 and the magnetic transfer device inherent numbers 320 are preferably recorded in a region of the disk medium in which any pattern is not transferred or a plurality of places on an outermost or innermost peripheral side, when the original servo pattern is transferred from the original board to the disk medium 1.

It is to be noted that in the present embodiment, it is assumed that a head 2 has a structure in which a read head element 20 is mounted separately from a write head element 21. In the head 2 having such structure, even when the same data is accessed, positions for positioning the respective elements 20, 21 at a write operation time is different from that at a read operation time. Therefore, in actual, pieces of the positioning correction information are required for exclusive use in the read head element 20 and the write head element 21, respectively.

Additionally, relative positions of the read head element 20 and the write head element 21 differ owing to manufacturing fluctuations of the head 2. Therefore, one of the pieces of the positioning correction information is information produced by use of a small number of representative disk mediums by means of the combinations of the original boards and the magnetic transfer devices. The other positioning correction information can be calculated by a linear interpolation method. This will be described hereinafter specifically.

For example, there will be described a case where the positioning correction information at the read operation time is calculated by the linear interpolation. Assuming that a relative distance between the read head element 20 and the write head element 21 is d, and a positioning correction value of a track n at the write operation time is x(n), a positioning correction value y at the read operation time is calculated from the following equation (1):

$$y(n)=(x(n+1)-x(n))/d+x(n) \quad (1).$$

When the CPU 11 incorporates into the disk drive the disk medium 1 onto which the original servo pattern of the original board is transferred, and writes the positioning correction information, the positioning correction information read from the correction information recording buffer 13 is written as such as the positioning correction information corresponding to the write head element 21. On the other hand, the CPU 11 writes as the positioning correction information corresponding to the read head element 20 the correction value calculated by the linear interpolation method using the positioning correction information corresponding to the write head element 21 by means of the equation (1).

It is to be noted that conversely, the positioning correction information read from the correction information recording buffer 13 may be written as such as the positioning correction information corresponding to the read head element 20, and the correction value calculated by the linear interpolation method may be written as the positioning correction information corresponding to the write head element 21.

In brief, the present embodiment relates to the servo information writing method of recording the positioning correction information for correcting the positioning error attributable to the distortion of the original servo information transferred from the original board onto the disk medium. The positioning correction information is written with respect to the disk medium in which the original servo information from the same original board is recorded.

According to the present embodiment, the positioning correction information produced based on the original servo information is written with respect to the disk medium in which the original servo information from the same original board is recorded without producing the positioning correction information for each disk medium. Therefore, it is possible to realize reduction of a time for producing the positioning correction information. As a result, the time required for the servo writing step can be reduced to enhance efficiency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A method of writing servo information for use in head positioning control on a disk medium incorporated in a disk drive, comprising:
    executing the positioning control of a head included in the disk drive based on original servo information recorded on the disk medium;
    producing positioning correction information to correct a positioning error by the positioning control;
    recording the positioning correction information in a storage unit different from the disk medium; and
    writing the positioning correction information read from the storage unit to the disk medium incorporated in the disk drive.

2. The method according to claim 1, wherein the writing comprises: acquiring the positioning correction information from the storage unit to write the positioning correction information in the disk medium, after the disk medium having the recorded original servo information has been incorporated in the disk drive.

3. The method according to claim 1, wherein the producing produces the positioning correction information for each of all tracks constituted on the disk medium, and
    the recording records in the storage unit the positioning correction information for each of all the tracks.

4. The method according to claim 1, further comprising:
    transferring and recording the original servo information to a disk medium incorporated in the disk drive from an original board in which the original servo information has been recorded.

5. The method according to claim 1, further comprising:
    transferring to and recording on a disk medium incorporated in the disk drive the original servo information from an original board in which the original servo information has been recorded,
    wherein the recording records the positioning correction information in the original board as the storage unit.

6. The method according to claim 1, further comprising:
    transferring to and recording on a disk medium incorporated in the disk drive the original servo information from an original board in which the original servo information has been recorded; and
    recording on the disk medium identification information to identify the original board.

7. The method according to claim 1, further comprising:
    transferring to and recording on a disk medium incorporated in the disk drive the original servo information from an original board in which the original servo information has been recorded; and recording on the disk medium identification information to identify the original board, wherein the recording associates the positioning correction information with the identification information to record the positioning correction information in the storage unit.

8. A disk drive comprising:

a disk medium on which original servo information has been recorded;

a head which records or reproduces data with respect to the disk medium;

a control unit which executes positioning control of the head based on the original servo information recorded on the disk medium and which produces positioning correction information to correct a positioning error in the positioning control;

a recording unit which records the positioning correction information in a storage unit different from the disk medium; and a servo writing unit which acquires the positioning correction information from the storage unit to write the positioning correction information to the disk medium by use of the head.

9. The disk drive according to claim 8, wherein the control unit produces the positioning correction information for each of all tracks constituted on the disk medium, and the recording unit records in the storage unit the positioning correction information for each of all the tracks.

10. The disk drive according to claim 8, wherein the disk medium records identification information to identify an original board to which the original servo information is transferred and recorded, and the recording unit associates the positioning correction information with the identification information to record the positioning correction information in the storage unit.

* * * * *